(12) United States Patent
Narita

(10) Patent No.: US 8,864,943 B2
(45) Date of Patent: Oct. 21, 2014

(54) METHOD FOR PREPARING NONIONIC WATER-SOLUBLE CELLULOSE ETHER

(75) Inventor: Mitsuo Narita, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/596,398

(22) Filed: Aug. 28, 2012

(65) Prior Publication Data

US 2013/0062027 A1   Mar. 14, 2013

(30) Foreign Application Priority Data

Sep. 8, 2011   (JP) ................................. 2011-196091

(51) Int. Cl.
*D21C 3/02*   (2006.01)

(52) U.S. Cl.
USPC ................................ 162/90; 536/84; 536/101

(58) Field of Classification Search
USPC .......................... 162/90; 536/95, 101, 84, 56
See application file for complete search history.

(56) References Cited

U.S. PATENT DOCUMENTS

| | | | |
|---|---|---|---|
| 2,102,205 | A | 12/1937 | Haskins et al. |
| 4,292,426 | A | 9/1981 | Orii et al. |
| 2007/0149774 | A1 | 6/2007 | Narita et al. |
| 2009/0165971 | A1* | 7/2009 | Narita .............................. 162/90 |
| 2009/0165972 | A1* | 7/2009 | Narita .............................. 162/90 |
| 2012/0103324 | A1 | 5/2012 | Osaki et al. |
| 2012/0214984 | A1 | 8/2012 | Narita |

FOREIGN PATENT DOCUMENTS

| | | |
|---|---|---|
| CN | 1990507 A | 7/2007 |
| EP | 2 075 259 | 7/2009 |
| GB | 729823 | 5/1955 |
| GB | 782842 | 9/1957 |
| JP | 53-12954 B | 5/1978 |
| JP | 54-145779 A | 11/1979 |
| JP | 56-000802 A | 1/1981 |
| JP | 01-123801 A | 5/1989 |
| JP | 10-259201 A | 9/1998 |
| JP | 11-504071 A | 4/1999 |
| JP | 2001-354701 A | 12/2001 |
| JP | 2007-197682 A | 8/2007 |
| JP | 2009-155534 A | 7/2009 |
| JP | 2012-188653 A | 10/2012 |
| WO | WO-98/21246 A1 | 5/1998 |
| WO | WO-2010/134560 A1 | 11/2010 |

OTHER PUBLICATIONS

Anderson, A.W., et al.; "The Evaluation of Pulp Requirements for Continuous Alkali Steeping in the Manufacture of Cellulose Ethers"; TAPPI; vol. 39, No. 8; Aug. 1956, pp. 548-553.
European Search Report for Application No. 12183284.4; dated Dec. 21, 2012.
Office Action for Japanese Application No. 2011-196091; dated Nov. 26, 2013.
Office Action for Chinese Application No. 201210326547.1; dated Apr. 24, 2014.

* cited by examiner

*Primary Examiner* — Mark Halpern
(74) *Attorney, Agent, or Firm* — Alston & Bird LLP

(57) ABSTRACT

Provided is a method for preparing nonionic water-soluble cellulose ether having low insoluble content and providing a transparent solution. More specifically, provided is a method for preparing nonionic water-soluble cellulose ether comprising at least the steps of: drying a pulp sheet or pulp chips into which the pulp sheet has been converted, bringing the dried pulp sheet or pulp chips into contact with an alkali metal hydroxide solution to obtain alkali cellulose, draining the alkali cellulose, and reacting the drained alkali cellulose with an etherifying agent.

2 Claims, No Drawings

METHOD FOR PREPARING NONIONIC WATER-SOLUBLE CELLULOSE ETHER

BACKGROUND OF THE INVENTION

1. Field of the Invention

The present invention relates to a method for preparing nonionic water-soluble cellulose ether having low insoluble fiber content and a high utilization ratio of an etherifying agent.

2. Description of the Related Art

When nonionic water-soluble cellulose ether is dissolved in water, it becomes tacky so that it is used for a thickener of transparent shampoos or rinses, hair dressing agents, eye drops, detergents for contact lens and the like. For example, nonionic water-soluble cellulose ether such as methyl cellulose or hydroxypropyl cellulose comprises a hydrophilic group and a hydrophobic group in the molecule thereof, thereby showing interfacial activity. It is therefore used as a suspension stabilizer in suspension polymerization of vinyl chloride or vinylidene chloride, and also used as a raw material for transparent wrap materials for domestic use. Products are desirably transparent in such applications. If an aqueous solution of nonionic water-soluble cellulose ether does not show molecular level dissolution and is therefore not transparent, products obtained may be inferior in transparency or in function due to occurrence of defective portions in the products. Although an aqueous solution of nonionic water-soluble cellulose ether is required to have a high viscosity, it is considered to be difficult to obtain a transparent aqueous solution because high-viscosity nonionic water-soluble cellulose ether has higher insoluble fiber content than low-viscosity cellulose ether.

With a view to overcoming these problems, according to Japanese Patent Application Examined Publication (JP-B) No. 53-12954/1978, proposed is a method comprising steps of allowing a raw material pulp to adsorb an aqueous alkali solution having a concentration of 15 to 75% by weight at a temperature of 5 to 80° C.; pressing the resulting pulp within 10 seconds after adsorption to remove an excess portion of the aqueous alkali solution; repeating the above steps to obtain alkali cellulose, and reacting the alkali cellulose with an etherifying agent.

According to Japanese Patent Application Unexamined Publication (JP-A) No. 10-259201/1998, proposed is a method comprising steps of impregnating a pulp having dichloromethane extract content of 0.07% by weight or less in an aqueous sodium hydroxide solution, pressing the resulting pulp to obtain alkali cellulose, and then etherifying the alkali cellulose.

According to Japanese Patent Application Unexamined Publication (JP-A) No. 2001-354701, nonionic water-soluble ether is obtained by grinding a pulp sheet having a sheet density of 0.4 to 1.0 g/ml into powders having an average particle size of 1000 μm or less, adding an alkali to the powders to obtain the alkali cellulose, and then reacting the alkali cellulose with methyl chloride, propylene oxide and the like.

A. W. Anderson and R. W. Swinehart, Tappi, Vol. 39, No. 8, 548-553, August, 1956, describes a method of impregnating a pulp sheet having a sheet density of 0.47 to 1.17 g/ml in a bath containing an alkali solution for 0.5 to 4.5 seconds to obtain alkali cellulose.

According to U.S. Pat. No. 2,102,205, pulp impregnated in an aqueous sodium hydroxide solution for 2 hours is pressed to obtain alkali cellulose.

SUMMARY OF THE INVENTION

The present inventors, however, have found the followings. In the method described in Japanese Patent Application Examined Publication (JP-B) No. 53-12954/1978, due to repeating adsorption and removal of an aqueous alkali solution twice, the swollen pulp tends to break easily during the second adsorption and removal, thereby causing troubles. In addition, nonionic water-soluble cellulose ether thus obtained does not have a satisfactory quality. In the method described in Japanese Patent Application Unexamined Publication (JP-A) No. 10-259201/1998 or 2001-354701, distribution of the alkali is likely to be uneven due to use of powdery pulp so that the alkali cellulose thus obtained is not satisfactory from the standpoint of insoluble fiber content. In the method described in A. W. Anderson and R. W. Swinehart, Tappi, Vol. 39, No. 8, 548-553, August, 1956, the distribution of the alkali becomes uneven because of impregnation in a short period of time so that the nonionic water-soluble cellulose ether thus obtained is not satisfactory. In the method described in U.S. Pat. No. 2,102,205, the obtained alkali cellulose is not suited for preparation of cellulose ether because it has a sodium hydroxide/cellulose weight ratio as very high as 3.0, thereby increasing a side reaction.

The invention has been made with the foregoing in view and an object is to provide a method for preparing nonionic water-soluble cellulose ether having low water insoluble content and providing a transparent solution thereof.

The invention provides a method for preparing nonionic water-soluble cellulose ether comprising at least steps of drying a pulp sheet or pulp chips into which the pulp sheet has been converted; bringing the dried pulp sheet or pulp chips into contact with an alkali metal hydroxide solution to obtain alkali cellulose; draining the alkali cellulose; and reacting the drained alkali cellulose with an etherifying agent.

According to the invention, nonionic water-soluble cellulose ether having low insoluble fiber content and providing a transparent solution thereof can be prepared.

DETAILED DESCRIPTION OF THE PREFERRED EMBODIMENTS

The present invention will be described more specifically.

The pulp sheet to be used in the invention may be wood pulp or cotton linter pulp. Pulp derived from wood is particularly preferred in order to obtain nonionic water-soluble cellulose ether having low insoluble fiber content. As the wood, softwood such as pine, spruce and hemlock, and hardwood such as eucalyptus and maple can be used.

The pulp chips to be used in the invention are obtained by cutting a pulp sheet. Although no limitation is imposed on the method of preparing pulp chips, conventional cutters such as a slitter cutter can be used. A cutter capable of cutting the pulp sheet successively is advantageous from the standpoint of an investment cost.

The pulp chip usually has a side of preferably from 2 to 100 mm, more preferably from 3 to 50 mm. When the pulp chip has a side of less than 2 mm, cellulose fibers may be damaged so that smooth penetration of an alkali metal hydroxide solution into the fibers may be hindered and homogeneous alkali cellulose may not be obtained. When pulp chip has a side of greater than 100 mm, it may become difficult to handle the pulp chips, particularly to charge them in an impregnation apparatus, transfer them inside the apparatus, or charge them in a separator.

The step of drying the pulp sheet or pulp chips to be brought into contact with an alkali metal hydroxide solution may be conducted by a batch system or a continuous system. Specific examples of drying can include hot-wind drying, drying by heating through a metal wall, drying with an infrared lamp as a heat source, high-frequency or microwave drying at 3 to 50 MHz, drying by leaving the pulp sheet or pulp chips to stand in a dry gas, and drying by letting a dry gas pass through the pulp sheet or pulp chips.

When the pulp is dried by a hot wind or by heating through a metal wall, the temperature of the hot wind or metal wall is preferably less than 300° C., more preferably less than 200° C. Temperatures exceeding 300° C. may cause thermal degradation of the pulp, which may lead to quality deterioration. When the hot wind is employed, drying in a blower oven or drying by a hot air stream during pneumatic transport in a piping may be used. When heating through a metal wall is employed, specific examples of the dryer used therefor include a rotary dryer equipped with a jacket structure, a screw conveyer type dryer, or a paddle type dryer.

In the method of drying by leaving the pulp sheet or pulp chips to stand in a dry gas, the pulp sheet or pulp chips may be left to stand in a storage cabinet, chamber, silo, or the like which has been adapted for a relative humidity at which the equilibrium moisture absorption of the pulp becomes less than 5% by weight. When the pulp sheet or pulp chips are left to stand at an atmospheric temperature of preferably 0 to 140° C., more preferably 20 to 100° C., the relative humidity is preferably less than 50%, more preferably less than 30%. As a dry atmosphere, nitrogen gas, air or the like can be used.

In the method of drying by letting a dry gas pass through the pulp sheet or pulp chips, the dry gas having a relative humidity at which the equilibrium moisture absorption content of the pulp becomes less than 5% by weight is used. When the gas for passing through the pulp or pulp chips has a temperature of preferably 0 to 140° C., more preferably 20 to 100° C., the relative humidity is preferably less than 50%, more preferably less than 30%. As a dry gas, nitrogen gas, air or the like can be used.

After the step of drying, the water content of the pulp is reduced to preferably 5% by weight or less, more preferably 2% by weight or less.

The term "water content" as used herein means a value calculated according to the following equation by using a dry matter content determined by the method specified in JIS P8203:1998 Determination of Dry Matter Content for Pulp.

Water content (%)=100−(dry matter content) (%)

In the above equation, the dry matter content is a ratio of the weight of a sample dried at 105±2° C. until reaching constant weight to a weight of the sample before dried. The dry matter content has a unit of %.

The water content of pulp is typically from 6.5 to 12% by weight. Decreasing the water content of pulp to 5% by weight or less decreases the number of insoluble fibers of cellulose ether. The reason is presumed to be that in the step of bringing the pulp into contact with an alkali hydroxide solution to obtain alkali cellulose, when pulp has high water content, the alkali hydroxide solution which has penetrated in the pulp is diluted with water contained in the pulp and heat upon dilution changes the quality of the cellulose molecules. If so, it is presumed to be possible to reduce the water content of pulp, thereby decreasing the dilution heat and reducing the degree of quality change. On the other hand, high water content of pulp results in two portions in the alkali cellulose, that is, a portion alkalinized with a high-concentration alkali hydroxide solution and a portion alkalinized with a low-concentration alkali hydroxide solution. Accordingly, the alkali cellulose cannot be etherified uniformly and produces a mixture of a portion with a high degree of substitution and a portion with a low degree of substitution. The portion with a low degree of substitution is presumed to become insoluble fibers.

An alkali metal hydroxide solution to be used in the step of bringing pulp into contact with the alkali hydroxide solution is not particularly limited insofar as it can convert the pulp into the alkali cellulose. From an economic reason, however, it is preferably selected from an aqueous solution of sodium hydroxide or potassium hydroxide. The concentration of the solution is preferably from 23 to 60% by weight, more preferably from 35 to 55% by weight. The alkali metal hydroxide solution is preferably an aqueous alkali metal hydroxide solution, but it may be a solution of alkali metal hydroxide in an alcohol such as ethanol or in a mixed solution of a water-soluble alcohol and water.

Examples of the contactor for bringing the pulp into contact include a bath type, a belt type, a rotary feeder type, a screw conveyer type, a bucket conveyer type, and a pipe type.

The temperature for bringing the pulp into contact is preferably from 5 to 70° C., more preferably from 15 to 60° C. When the temperature is less than 5° C., the alkali metal hydroxide solution has a high viscosity, which may lower the absorption rate of the pulp absorbing the solution. Thus, such a low temperature may not be preferred from the standpoint of the productivity. When the temperature is more than 70° C., the alkali metal hydroxide solution has a low viscosity, which may increase the absorption rate of the pulp absorbing the solution. As a result, the composition of the alkali cellulose may have large variation. Thus, such a high temperature may not be preferred from the standpoint of quality.

The period of time for bringing the pulp into contact with excess alkali metal hydroxide is preferably more than 10 seconds but not greater than 600 seconds, more preferably from 15 to 120 seconds. The contact time of not greater than 10 seconds may not be preferred from the standpoint of quality because the composition of the resulting alkali cellulose may vary greatly. The contact time of more than 600 seconds may not result in alkali cellulose having a desired composition because the pulp absorbs the alkali metal hydroxide excessively.

The aqueous metal hydroxide solution to be used for bringing the pulp into contact is preferably in such an amount that a weight ratio of (alkali metal hydroxide solution)/(cellulose) is higher than a subsequent weight ratio of (alkali metal hydroxide solution)/(cellulose) in the alkali cellulose product to be subjected to a etherification reaction. The weight ratio of the aqueous alkali metal hydroxide solution to be used for bringing pulp into contact to solid component in pulp (alkali metal hydroxide solution/solid component in pulp) is in the range of preferably from 3 to 5,000, more preferably from 10 to 200, still more preferably from 20 to 60. When the weight ratio is less than the above range, it may become difficult to bring the pulp into uniform contact with the alkali metal hydroxide. Although no particular limitation is imposed on the upper limit, an excess alkali metal hydroxide solution requires excessively large equipment so that the weight ratio of about 5000 is usually preferred in consideration of economy.

It should be noted that not the weight of the alkali metal hydroxide but the weight of the alkali metal hydroxide solution is used because it is important to physically bring the pulp into uniform contact with (impregnate the pulp with) the alkali metal hydroxide solution in order to avoid such a situation that an amount of the alkali metal hydroxide solution is so small that some of the pulp is not in contact (not wetted) with the alkali metal hydroxide solution.

Next, in the step of draining the alkali cellulose, pressing the alkali cellulose under pressure by using a roller or another apparatus, or pressing the alkali cellulose by using centrifugal separation or another mechanical method can be used. Use of the centrifugal separation is preferred.

In the invention, the amount of the alkali metal hydroxide solution to be used for bringing the pulp into contact is selected so that the weight ratio of the alkali metal hydroxide component determined by neutralization titration of the alkali cellulose obtained in the step of draining to the solid component in the pulp (alkali metal hydroxide component/solid component in pulp) is preferably from 0.3 to 1.5, more preferably from 0.65 to 1.30, still more preferably from 0.90 to 1.30.

Since the pulp as a starting material typically consists essentially of cellulose and water, the solid component in the pulp is cellulose. When the above-described weight ratio is from 0.3 to 1.5, the resulting nonionic water-soluble cellulose may provide a solution with higher transparency.

The solid component in the pulp comprises, in addition to cellulose which is a main component, organic matter such as hemicellulose, lignin, or resin, and/or inorganic matter such as Si or Fe.

With regard to the alkali cellulose obtained in the step of draining, the weight ratio of (alkali metal hydroxide component)/(solid component in pulp) can be determined by using the following neutralization titration when the alkali metal hydroxide is, for example, sodium hydroxide.

The total weight of the alkali cellulose cake obtained in the draining step is measured. An amount (% by weight: wt %) of the alkali metal hydroxide in 4.00 g of the alkali cellulose cake obtained in the step of draining is determined by neutralization titration (0.5 mol/L $H_2SO_4$, phenolphthalein as an indicator). A blank test is carried out in the same manner.

wt % of alkali metal hydroxide=(normality factor)×
{amount (ml) of $H_2SO_4$ added dropwise−amount
(ml) of $H_2SO_4$ added dropwise in blank test}

In the above equation, the molecular weight of sodium hydroxide is set at 40.

If the wt % of the alkali metal hydroxide can be determined, it is possible to determine the "alkali metal hydroxide component" in the total amount of the alkali cellulose cake obtained in the step of draining.

The "solid component in the pulp" can be determined, for example, by sampling about 2 g of the pulp, drying it at 105° C. for 4 hours, and finding the wt % of the dried pulp in the weight of the sampled pulp.

The weight ratio of (alkali metal hydroxide component)/(solid component in pulp) in the alkali cellulose obtained in the step of draining is, as described below, approximately same as the weight ratio of (alkali metal hydroxide component)/(alkali cellulose component in narrow sense) in the alkali cellulose obtained in the step of draining.

By using the wt % of the alkali metal hydroxide in the cake, the (alkali metal hydroxide component)/(alkali cellulose component in narrow sense) can be determined in accordance with the following equation:

(weight of alkali metal hydroxide)/(weight of alkali
cellulose component in) narrow sense)=(wt % of
alkali metal hydroxide)/[{100−(wt % of alkali
metal hydroxide)/(B/100)}×(S/100)]

In the above equation, B represents the concentration (wt %) of the alkali metal hydroxide solution used and S represents the concentration (wt %) of the solid component in the pulp. In the above equation, 100−(wt % of alkali metal hydroxide)/(B/100) means wt % of the component other than the alkali metal hydroxide solution in the cake. Supposing that alkali cellulose in narrow sense is present at the same wt % as wt % of the solid component in the pulp, S/100 is multiplied to obtain the wt % of the alkali cellulose.

The term "alkali cellulose in narrow sense" means a concept of alkali cellulose narrower than the alkali cellulose containing the alkali metal hydroxide which is obtained by the step of draining. It means the alkali cellulose itself obtained by removing the alkali metal hydroxide solution from the alkali cellulose containing the alkali metal hydroxide which is obtained in the step of draining.

In the step of reacting the alkali cellulose thus obtained with an etherifying agent, the alkali cellulose can be fed to an etherification reactor after being cut into pieces with appropriate sizes, for example, into chips. The etherification reactor is preferably a reactor in which etherification reaction is carried out while crushing the alkali cellulose by a mechanical force until the chips lose their shapes. Accordingly, a reactor comprising a stirring mechanism therein is preferred, including a plough shear mixer. Alternatively, prior to charging the alkali cellulose in the etherification reactor, it can be crushed in advance by another apparatus comprising therein a stirring mechanism or a crushing apparatus such as a cutter mill.

Examples of the etherifying agent include alkyl halide such as methyl chloride or ethyl chloride; and alkylene oxide such as ethylene oxide or propylene oxide.

After the pulp and the alkali metal hydroxide are brought into contact with each other, aging proceeds with homogenization and mercerization. The aging does not progress sufficiently for a short period of time so that the insoluble fiber content of the cellulose ether produced by etherification of such alkali cellulose increases. For this reason, in the alkali cellulose to be reacted with the etherifying agent, a ratio of the alkali cellulose portion having elapse time of 60 minutes or less after the pulp and the excess alkali metal hydroxide are brought into contact is preferably 50% by weight or less, more preferably 30% by weight or less. When the alkali cellulose portion having elapse time of 60 minutes or less after the pulp and the excess alkali metal hydroxide are brought into contact becomes more than 50%, the insufficiently aged portion may increase so that the insoluble fiber content of the nonionic water-soluble cellulose ether may increase.

Examples of the nonionic water-soluble cellulose ether of the invention include alkyl cellulose such as methyl cellulose (MC); hydroxyalkyl cellulose such as hydroxypropyl cellulose (HPC) or hydroxyethyl cellulose (HEC); and hydroxyalkylalkyl cellulose such as hydroxypropylmethyl cellulose (HPMC), hydroxyethylmethyl cellulose (HEMC) or hydroxyethylethyl cellulose (HEEC).

Examples of the alkyl cellulose include methyl cellulose having a methoxy group (DS) of 1.0 to 2.2 and ethyl cellulose having an ethoxy group (DS) of 2.0 to 2.6.

Examples of the hydroxyalkyl cellulose include hydroxyethyl cellulose having a hydroxyethoxy group (MS) of 0.05 to 3.0 and hydroxypropyl cellulose having a hydroxypropoxy group (MS) of 0.05 to 3.3.

Examples of the hydroxyalkylalkyl cellulose include hydroxyethylmethyl cellulose having a methoxy group (DS) of 1.0 to 2.2 and a hydroxyethoxy group (MS) of 0.1 to 0.6, hydroxypropylmethyl cellulose having a methoxy group (DS) of 1.0 to 2.2 (DS) and a hydroxypropoxy group (MS) of 0.1 to 0.6, and hydroxyethylethyl cellulose having an ethoxy group (DS) of 1.0 to 2.2 and a hydroxyethoxy group (MS) of 0.1 to 0.6.

It should be noted that typically, DS is used for a substitution degree and MS is used for a molar substitution number, wherein DS means an average number of hydroxyl groups substituted by alkoxy groups per glucose ring unit of cellulose, and MS means an average molar number of hydroxyalkoxy groups added per glucose ring unit of cellulose. They can be calculated based on the results measured by using the method of the Japanese Pharmacopoeia.

According to the invention, the utilization ratio of the etherifying agent can be increased. As a result, the amount of an expensive etherifying agent necessary for obtaining the intended degree of substitution can be reduced so that a production cost can be reduced. In addition, it is possible to reduce the amount of byproducts such as alcohol and ether derived from the alkyl halide and alkylene glycol derived from alkylene oxide, leading to a reduction in the cost for treating them (incineration, microbial treatment) or a reduction in environmental burdens. The utilization ratio of the etherifying agent can be calculated in the following manner.

When alkyl halide such as methyl chloride reacts with cellulose, an equimolar amount of alkali metal hydroxide such as sodium hydroxide is consumed. To make a reaction rate of the alkali metal hydroxide almost 100%, an excess amount of alkyl halide relative to that of the alkali metal hydroxide is usually charged in a reactor. The utilization ratio of the alkyl halide is calculated based on the amount of the alkali metal hydroxide.

Utilization ratio (%) of alkyl halide={DS/(molar ratio of alkali metal hydroxide charged relative to cellulose)}×100

The utilization ratio of alkylene oxide such as propylene oxide when the alkylene oxide reacts with cellulose is also calculated based on the amount of the alkali metal hydroxide such as sodium hydroxide.

Utilization ratio (%) of alkylene oxide={MS/(molar ratio of alkali metal hydroxide charged relative to cellulose)}×100

According to the invention, the nonionic water-soluble cellulose ether preferably meets the following requirement as needed in order to enhance solubility. When 100 g of nonionic water-soluble cellulose ether powder are shaken for 30 minutes under the conditions of 200 shakes per minute, 156 strokes per minute, and an amplitude of 50 mm by using a model 429 Low-Tap Sieve Shaker, product of Kansai Wire Netting Co., Ltd., fitted with a No. 100 standard sieve (having an opening of 150 µm) as prescribed by JIS Z8801, 25% by weigh or less remains on the sieve.

The viscosity of an aqueous 2% by weight solution of the obtained nonionic water-soluble cellulose ether at 20° C. is preferably 2 to 30000 mPa/s, more preferably 300 to 30000 mPa/s.

If the nonionic water-soluble cellulose ether has an insufficient degree of substitution or is prepared without uniform substitution reaction, many insoluble fibers having sizes of about 16 to 200 µm remain at the time of dissolution in water. The number of insoluble fibers having sizes of 16 µm to 200 µm which are present in 2 ml of an aqueous 0.1% by weight solution of the obtained nonionic water-soluble cellulose ether is preferably 100 or less, more preferably 60 or less.

The number of insoluble fibers can be determined by dissolving the nonionic water-soluble cellulose ether in ISO-TON II (product of Coulter, Inc.), an aqueous electrolyte solution for use with Coulter Counters, in a thermostatic chamber of 25° C. to prepare an aqueous 0.1% by weight solution, and counting the number of insoluble fibers having sizes of 16 µm to 200 µm in 2 ml of the resulting solution by means of a Model TA II or a Multisizer, Coulter Counter of Coulter, Inc., using an aperture tube having a diameter of 400 µm. When the concentration of the nonionic water-soluble cellulose ether is too small to count the number of the insoluble fibers, the number of insoluble fibers can be determined by counting them in a high-concentration solution as needed and converted into the number in an aqueous 0.1% by weight solution.

The light transmittance of an aqueous 2% by weight solution of the nonionic water-soluble cellulose ether of the invention at 30° C. is preferably 96% or greater, particularly preferably 97% or greater as measured using a photoelectric colorimeter PC-50 with a cell length of 20 mm and a visible light.

EXAMPLES

The present invention will be described further in detail in Examples and Comparative Examples. It should not be construed that the invention is limited to or by Examples.

Example 1

A 20 cm×30 cm pulp sheet having water content of 8.0% by weight was dried in a blower oven of 80° C. for 30 minutes to decrease the water content to 5.0% by weight. Immediately, the dried pulp sheet was impregnated in an aqueous 49% by weight NaOH solution of 40° C. for 30 seconds and then pressed to remove an excess aqueous 49% by weight NaOH solution to obtain alkali cellulose. The weight ratio of (aqueous 49 wt % NaOH solution)/(solid component in pulp) in the impregnation step was 100. The weight ratio of (NaOH component in the obtained alkali cellulose)/(solid component in pulp) was 1.23.

The alkali cellulose thus obtained was placed in an internal-stirring type pressure-resistant reactor in such an amount that the cellulose portion of the alkali cellulose was 5.5 kg. After vacuuming, 9.4 kg of methyl chloride and 2.90 kg of propylene oxide were added thereto for the reaction, followed by washing, drying and pulverization to obtain hydroxypropylmethyl cellulose.

The hydroxypropylmethyl cellulose thus obtained had a degree of methoxyl substitution (DS) of 1.9 and a degree of hydroxypropoxyl substitution (MS) of 0.24. The number of insoluble fibers having sizes of 16 µm to 200 µm was 40. The results are shown in Table 1.

Example 2

A dried nitrogen gas of 25° C. having a relative humidity of 0% passed through 10 mm×10 mm pulp chips having water content of 8.0% by weight for 20 minutes to decrease the water content to 4.0% by weight. Immediately, the dried pulp chips were impregnated in an aqueous 49% by weight NaOH solution of 40° C. for 28 seconds, followed by centrifugal separation to remove an excess portion of the aqueous 49% by weight NaOH solution to obtain alkali cellulose. The weight ratio of (aqueous 49 wt % NaOH solution)/(solid component in pulp) in the impregnation step was 30. The weight ratio of (NaOH component in the obtained alkali cellulose)/(solid component in pulp) was 1.21. The alkali cellulose thus obtained was placed in an internal-stirring type pressure-resistant reactor in such an amount that the cellulose portion of the alkali cellulose was 5.5 kg. After vacuuming, 9.2 kg of methyl chloride and 2.86 kg of propylene oxide were added thereto for the reaction, followed by washing, drying and pulverization in the same manner as in Example 1 to obtain hydroxypropylmethyl cellulose. The results are shown in Table 1.

Example 3

A dried nitrogen gas of 25° C. having a relative humidity of 0% passed through 10 mm×10 mm pulp chips having water content of 8.0% by weight for 30 minutes to decrease the water content to 2.0% by weight. Immediately, the dried pulp chips were impregnated in an aqueous 49% by weight NaOH solution of 40° C. for 27 seconds, followed by centrifugal separation to remove an excess portion of the aqueous 49% by weight NaOH solution to obtain alkali cellulose. The weight ratio of (aqueous 49 wt % NaOH solution)/(solid component in pulp) in the impregnation step was 30. The weight ratio of (NaOH component in the obtained alkali cellulose)/(solid component in pulp) was 1.205. The alkali cellulose thus obtained was placed in an internal-stirring type pressure-resistant reactor in such an amount that the cellulose portion of the alkali cellulose was 5.5 kg. After vacuuming, 9.17 kg of methyl chloride and 2.81 kg of propylene oxide were added thereto for the reaction, followed by washing, drying and pulverization in the same manner as in Example 1 to obtain hydroxypropylmethyl cellulose. The results are shown in Table 1.

Example 4

Air of 100° C. having a relative humidity of 2% was brought into contact with 10 mm×10 mm pulp chips having water content of 8.0% by weight for 60 seconds to decrease the water content to 0.5% by weight. Immediately, the dried pulp chips were impregnated in an aqueous 49% by weight NaOH solution of 40° C. for 25 seconds, followed by centrifugal separation to remove an excess portion of the aqueous 49% by weight NaOH solution to obtain alkali cellulose. The weight ratio of (aqueous 49 wt % NaOH solution)/(solid component in pulp) in the impregnation step was 30. The weight ratio of (NaOH component in the obtained alkali cellulose)/(solid component in pulp) was 1.20. The alkali cellulose thus obtained was placed in an internal-stirring type pressure-resistant reactor in such an amount that the cellulose portion of the alkali cellulose was 5.5 kg. After vacuuming, 9.1 kg of methyl chloride and 2.76 kg of propylene oxide were added thereto for the reaction, followed by washing, drying and pulverization in the same manner as in Example 1 to obtain hydroxypropylmethyl cellulose. The results are shown in Table 1.

Example 5

Alkali cellulose was obtained in the same manner as in Example 1 except that the pulp sheet was impregnated in an aqueous 49% by weight NaOH solution of 20° C. for 10 seconds and then pressed. The weight ratio of (NaOH component in the obtained alkali cellulose)/(solid component in pulp) was 0.670.

The obtained alkali cellulose was placed in an internal-stirring type pressure-resistant reactor in such an amount that the cellulose portion of the alkali cellulose was 5.5 kg. After vacuuming, 5.10 kg of methyl chloride and 1.22 kg of propylene oxide were added thereto for the reaction, followed by washing, drying and pulverization to obtain hydroxypropylmethyl cellulose.

The hydroxypropylmethyl cellulose thus obtained had a degree of methoxyl substitution (DS) of 1.50 and a degree of hydroxypropoxyl substitution (MS) of 0.20. The results are shown in Table 1.

Example 6

A nitrogen gas of 10° C. having a relative humidity of 0% passed through 10 mm×10 mm pulp chips having water content of 6.0% by weight for 20 minutes to decrease the water content to 3.0% by weight. Immediately, the dried pulp chips were impregnated in an aqueous 49% by weight NaOH solution of 40° C. for 28 seconds, followed by centrifugal separation to remove an excess portion of the aqueous 49% by weight NaOH solution to obtain alkali cellulose. The weight ratio of (aqueous 49 wt % NaOH solution)/(solid component in pulp) in the impregnation step was 30. The weight ratio of (NaOH component in the obtained alkali cellulose)/(solid component in pulp) was 1.21. The alkali cellulose thus obtained was placed in an internal-stirring type pressure-resistant reactor in such an amount that the cellulose portion of the alkali cellulose was 5.5 kg. After vacuuming, 9.2 kg of methyl chloride and 2.86 kg of propylene oxide were added thereto for the reaction, followed by washing, drying and pulverization in the same manner as in Example 1 to obtain hydroxypropylmethyl cellulose. The results are shown in Table 1.

Example 7

A dried nitrogen gas of 0° C. having a relative humidity of 0% passed through 10 mm×10 mm pulp chips having water content of 10.0% by weight for 10 hours to decrease the water content to 2.0% by weight. Immediately, the dried pulp chips were impregnated in an aqueous 49% by weight NaOH solution of 40° C. for 27 seconds, followed by centrifugal separation to remove an excess portion of the aqueous 49% by weight NaOH solution to obtain alkali cellulose. The weight ratio of (aqueous 49 wt % NaOH solution)/(solid component in pulp) in the impregnation step was 30. The weight ratio of (NaOH component in the obtained alkali cellulose)/(solid component in pulp) was 1.205. The alkali cellulose thus obtained was placed in an internal-stirring type pressure-resistant reactor in such an amount that the cellulose portion of the alkali cellulose was 5.5 kg. After vacuuming, 9.17 kg of methyl chloride and 2.81 kg of propylene oxide were added thereto for the reaction, followed by washing, drying and pulverization in the same manner as in Example 1 to obtain hydroxypropylmethyl cellulose. The results are shown in Table 1.

Example 8

Air of 100° C. having a relative humidity of 2% was brought contact with 10 mm×10 mm pulp chips having water content of 12.0% by weight for 60 seconds to decrease the water content to 0.5% by weight. Immediately, the dried pulp chips were impregnated in an aqueous 49% by weight NaOH solution of 40° C. for 25 seconds, followed by centrifugal separation to remove an excess portion of the aqueous 49% by weight NaOH solution to obtain alkali cellulose. The weight ratio of (aqueous 49 wt % NaOH solution)/(solid component in pulp) in the impregnation step was 30. The weight ratio of (NaOH component in the obtained alkali cellulose)/(solid component in pulp) was 1.20. The alkali cellulose thus obtained was placed in an internal-stirring type pressure-resistant reactor in such an amount that the cellulose portion of the alkali cellulose was 5.5 kg. After vacuuming, 9.1 kg of methyl chloride and 2.76 kg of propylene oxide were added thereto for the reaction, followed by washing, drying and pulverization in the same manner as in Example 1 to obtain hydroxypropylmethyl cellulose. The results are shown in Table 1.

Example 9

Air of 140° C. having a relative humidity of 30% was brought contact with 10 mm×10 mm pulp chips having water content of 12.0% by weight for 60 seconds to decrease the water content to 5.0% by weight. Immediately, the dried pulp chips were impregnated in an aqueous 49% by weight NaOH solution of 40° C. for 25 seconds, followed by centrifugal separation to remove an excess portion of the aqueous 49% by weight NaOH solution to obtain alkali cellulose. The weight ratio of (aqueous 49 wt % NaOH solution)/(solid component in pulp) in the impregnation step was 30. The weight ratio of (NaOH component in the obtained alkali cellulose)/(solid component in pulp) was 1.23. The alkali cellulose thus obtained was placed in an internal-stirring type pressure-resistant reactor in such an amount that the cellulose portion of the alkali cellulose was 5.5 kg. After vacuuming, 9.4 kg of methyl chloride and 2.90 kg of propylene oxide were added thereto for the reaction, followed by washing, drying and pulverization in the same manner as in Example 1 to obtain hydroxypropylmethyl cellulose. The results are shown in Table 1.

Example 10

Air of 25° C. having a relative humidity of 30% was brought contact with 10 mm×10 mm pulp chips having water content of 12.0% by weight for 5 hours to decrease the water content to 5.0% by weight. Immediately, the dried pulp chips were impregnated in an aqueous 49% by weight NaOH solution of 40° C. for 25 seconds, followed by centrifugal separation to remove an excess portion of the aqueous 49% by weight NaOH solution to obtain alkali cellulose. The weight ratio of (aqueous 49 wt % NaOH solution)/(solid component in pulp) in the impregnation step was 30. The weight ratio of (NaOH component in the obtained alkali cellulose)/(solid component in pulp) was 1.23. The alkali cellulose thus obtained was placed in an internal-stirring type pressure-resistant reactor in such an amount that the cellulose portion of the alkali cellulose was 5.5 kg. After vacuuming, 9.4 kg of methyl chloride and 2.90 kg of propylene oxide were added thereto for the reaction, followed by washing, drying and pulverization in the same manner as in Example 1 to obtain hydroxypropylmethyl cellulose. The results are shown in Table 1.

Comparative Example 1

Alkali cellulose was obtained in the same manner as in Example 1 except that a 20 cm×30 cm pulp sheet having water content of 8.0% by weight was not dried, and was impregnated in an aqueous 49% by weight NaOH solution of 40° C. for 32 seconds and then pressed. The weight ratio of (NaOH component in the obtained alkali cellulose)/(solid component in pulp) was 1.24.

The obtained alkali cellulose was placed in an internal-stirring type pressure-resistant reactor in such an amount that the cellulose portion of the alkali cellulose was 5.5 kg. After vacuuming, 9.5 kg of methyl chloride and 3.03 kg of propylene oxide were added thereto for the reaction, followed by washing, drying and pulverization as in Example 1 to obtain hydroxypropylmethyl cellulose. Evaluation results are shown in Table 1.

Comparative Example 2

Alkali cellulose was obtained in the same manner as in Example 1 except that a 20 cm×30 cm pulp sheet having water content of 8.0% by weight was not dried, and was impregnated in an aqueous 49% by weight NaOH solution of 20° C. for 10 seconds and then pressed. The weight ratio of (NaOH component in the obtained alkali cellulose)/(solid component in pulp) was 0.673.

The obtained alkali cellulose was placed in an internal-stirring type pressure-resistant reactor in such an amount that the cellulose portion of the alkali cellulose was 5.5 kg. After vacuuming, 5.14 kg of methyl chloride and 1.23 kg of propylene oxide were added thereto for the reaction, followed by washing, drying and pulverization in the same manner as in Example 1 to obtain hydroxypropylmethyl cellulose. Evaluation results are shown in Table 1.

Comparative Example 3

Alkali cellulose was obtained in the same manner as in Example 1 except that a 20 cm×30 cm pulp sheet having water content of 6.0% by weight was not dried, and was impregnated in an aqueous 49% by weight NaOH solution of 40° C. for 33 seconds and then pressed. The weight ratio of (NaOH component in the obtained alkali cellulose)/(solid component in pulp) was 1.235.

The obtained alkali cellulose was placed in an internal-stirring type pressure-resistant reactor in such an amount that the cellulose portion of the alkali cellulose was 5.5 kg. After vacuuming, 9.5 kg of methyl chloride and 2.97 kg of propylene oxide were added thereto for the reaction, followed by washing, drying and pulverization in the same manner as in Example 1 to obtain hydroxypropylmethyl cellulose. Evaluation results are shown in Table 1.

Comparative Example 4

Alkali cellulose was obtained in the same manner as in Example 1 except that a 20 cm×30 cm pulp sheet having water content of 10.0% by weight was not dried, and was impregnated in an aqueous 49% by weight NaOH solution of 40° C. for 34 seconds and then pressed. The weight ratio of (NaOH component in the obtained alkali cellulose)/(solid component in pulp) was 1.26.

The obtained alkali cellulose was placed in an internal-stirring type pressure-resistant reactor in such an amount that the cellulose portion of the alkali cellulose was 5.5 kg. After vacuuming, 9.6 kg of methyl chloride and 3.10 kg of propylene oxide were added thereto for the reaction, followed by washing, drying and pulverization in the same manner as in Example 1 to obtain hydroxypropylmethyl cellulose. Evaluation results are shown in Table 1.

Comparative Example 5

Alkali cellulose was obtained in the same manner as in Example 1 except that a 20 cm×30 cm pulp sheet having water content of 12.0% by weight was not dried, and was impregnated in an aqueous 49% by weight NaOH solution of 40° C. for 36 seconds and then pressed. The weight ratio of (NaOH component in the obtained alkali cellulose)/(solid component in pulp) was 1.27.

The obtained alkali cellulose was placed in an internal-stirring type pressure-resistant reactor in such an amount that the cellulose portion of the alkali cellulose was 5.5 kg. After vacuuming, 9.7 kg of methyl chloride and 3.15 kg of propylene oxide were added thereto for the reaction, followed by washing, drying and pulverization in the same manner as in Example 1 to obtain hydroxypropylmethyl cellulose. Evaluation results are shown in Table 1.

As shown in Table 1, the dried pulp, in comparison with the undried pulp, decreased an amount of etherifying agents (methyl chloride and propylene oxide) added to obtain predetermined degrees of methoxyl substitution and hydroxypropoxyl substitution, resulting in the product at a lower cost. This decrease occurred because of an increase in the utilization ratio of the etherifying agent. In addition, light transmittance increased, and the number of insoluble fibers decreased.

TABLE 1

|  | water content of pulp just before contact with alkali metal hydroxide sol. (wt %) | substitution degree (methoxy group) DS | molar substitution degree (hydroxypropoxy group) MS | utilization ratio of methyl chloride (%) | utilization ratio of propylene oxide (%) | weight ratio of methyl chloride to cellulose | weight ratio of propylene oxide to cellulose | light transmittance of aq. solution at 5° C. (%) | number of insoluble fibers having sizes of 16 to 200 μm |
|---|---|---|---|---|---|---|---|---|---|
| Example 1 | 5.0 | 1.90 | 0.24 | 38.1 | 16.3 | 1.709 | 0.527 | 99.0 | 20 |
| Example 2 | 4.0 | 1.90 | 0.24 | 38.5 | 16.5 | 1.672 | 0.520 | 99.0 | 17 |
| Example 3 | 2.0 | 1.90 | 0.24 | 38.8 | 16.8 | 1.667 | 0.511 | 99.0 | 15 |
| Example 4 | 0.5 | 1.90 | 0.24 | 39.1 | 17.1 | 1.655 | 0.502 | 99.0 | 11 |
| Example 5 | 5.0 | 1.50 | 0.20 | 55.4 | 32.2 | 0.927 | 0.222 | 98.0 | 50 |
| Example 6 | 3.0 | 1.90 | 0.24 | 38.5 | 16.5 | 1.672 | 0.520 | 99.0 | 16 |
| Example 7 | 2.0 | 1.90 | 0.24 | 38.8 | 16.8 | 1.667 | 0.511 | 99.0 | 14 |
| Example 8 | 0.5 | 1.90 | 0.24 | 39.1 | 17.1 | 1.655 | 0.502 | 99.0 | 12 |
| Example 9 | 5.0 | 1.90 | 0.24 | 38.1 | 16.3 | 1.709 | 0.527 | 99.0 | 22 |
| Example 10 | 5.0 | 1.90 | 0.24 | 38.1 | 16.3 | 1.709 | 0.527 | 99.0 | 21 |
| Comp. Ex. 1 | 8.0 | 1.90 | 0.24 | 37.8 | 15.6 | 1.727 | 0.551 | 98.0 | 60 |
| Comp. Ex. 2 | 8.0 | 1.50 | 0.20 | 55.0 | 32.0 | 0.935 | 0.224 | 95.0 | 175 |
| Comp. Ex. 3 | 6.0 | 1.90 | 0.24 | 38.0 | 15.9 | 1.727 | 0.540 | 98.0 | 58 |
| Comp. Ex. 4 | 10.0 | 1.90 | 0.24 | 37.2 | 15.2 | 1.745 | 0.564 | 96.0 | 84 |
| Comp. Ex. 5 | 12.0 | 1.90 | 0.24 | 36.9 | 15.0 | 1.764 | 0.573 | 94.0 | 120 |

The invention claimed is:

1. A method for preparing nonionic water-soluble cellulose ether, comprising at least the steps of:
   drying a pulp sheet or pulp chips, said drying step comprises reduction of water content of the sheet or the chips to 5% by weight or less;
   bringing the dried pulp sheet or pulp chips into immediate contact with an alkali metal hydroxide solution to obtain alkali cellulose;
   draining the alkali cellulose; and
   reacting the drained alkali cellulose with an etherifying agent to prepare a nonionic water-soluble cellulose ether.

2. The method according to claim 1, wherein the nonionic water-soluble cellulose ether is alkyl cellulose, hydroxyalkyl cellulose or hydroxyalkylalkyl cellulose.

* * * * *